(12) United States Patent
De Vos et al.

(10) Patent No.: US 11,928,746 B2
(45) Date of Patent: Mar. 12, 2024

(54) SYSTEMS AND METHODS FOR PROCESSING CONTRIBUTIONS MADE TO PURCHASER SELECTED ORGANIZATIONS

(71) Applicant: POPULUS FINANCIAL GROUP, INC., Irving, TX (US)

(72) Inventors: Paul De Vos, Dallas, TX (US); Joseph Taylor, Sachse, TX (US); Shirish Gadre, Coppell, TX (US)

(73) Assignee: Populus Financial Group, Inc., Irving, TX (US)

( * ) Notice: Subject to any disclaimer, the term of this patent is extended or adjusted under 35 U.S.C. 154(b) by 0 days.

(21) Appl. No.: 16/933,742

(22) Filed: Jul. 20, 2020

(65) Prior Publication Data
US 2022/0020098 A1   Jan. 20, 2022

(51) Int. Cl.
*G06Q 50/00*   (2012.01)
*G06F 16/23*   (2019.01)
(Continued)

(52) U.S. Cl.
CPC ......... *G06Q 50/01* (2013.01); *G06F 16/2379* (2019.01); *G06Q 20/407* (2013.01);
(Continued)

(58) Field of Classification Search
CPC .. G06Q 50/01; G06Q 20/407; G06Q 30/0279; G06Q 40/02; G06Q 40/123;
(Continued)

(56) References Cited

U.S. PATENT DOCUMENTS 6,819,974 B1 * 11/2004 Coleman ............. G05B 19/401
700/110
8,566,749 B2 * 10/2013 Kashik ................ G06F 3/04815
715/848

(Continued)

OTHER PUBLICATIONS

International Search Report and Written Opinion dated Nov. 4, 2021, by the U.S. Receiving Office in counterpart PCT Application No. PCT/US2021/042410, 12 pages.

*Primary Examiner* — Peter Ludwig
(74) *Attorney, Agent, or Firm* — Finnegan, Henderson, Farabow, Garrett & Dunner LLP (57) ABSTRACT

Systems and methods configured for receiving, from a user device associated with a user, a first request to associate the user with a target and account information associated with the user; retrieving the target from a database to associate the user with the retrieved target; receiving, from an entity, event data associated with the account information; computing an amount of contribution based on the received event data; transmitting the computed amount of contribution to a distribution system configured to distribute the contribution to the associated target; updating the database by aggregating the computed amount of contribution to a stored contribution data associated with the user; retrieving pre-authenticated data of the user allowing transmission of a message to a public forum; generating the message based on the event data and the computed amount of contribution; and transmitting the message to one or more devices via the public forum.

20 Claims, 4 Drawing Sheets

(51) Int. Cl.
*G06Q 20/40* (2012.01)
*G06Q 30/0279* (2023.01)
*G06Q 40/02* (2023.01)
*G06Q 40/12* (2023.01)
*H04L 9/40* (2022.01)
*H04L 51/52* (2022.01)

(52) U.S. Cl.
CPC ......... *G06Q 30/0279* (2013.01); *G06Q 40/02* (2013.01); *G06Q 40/123* (2013.12); *H04L 51/52* (2022.05); *H04L 63/08* (2013.01)

(58) Field of Classification Search
CPC .. G06Q 20/027; G06Q 20/102; G06Q 20/405; G06F 16/2379; H04L 51/32; H04L 63/08; H04L 2463/102
See application file for complete search history.

(56) References Cited

U.S. PATENT DOCUMENTS

| | | | | |
|---|---|---|---|---|
| 8,994,731 | B2 * | 3/2015 | Nevins | G06F 16/2477 |
| | | | | 345/440 |
| 9,128,116 | B2 * | 9/2015 | Welch | G01C 25/005 |
| 10,386,271 | B1 * | 8/2019 | King | G01M 99/005 |
| 10,733,196 | B2 * | 8/2020 | Glickman | G06F 16/26 |
| 11,010,787 | B1 * | 5/2021 | Tietzen | G06Q 30/0246 |
| 2002/0038225 | A1 | 3/2002 | Klasky et al. | |
| 2008/0145911 | A1 * | 6/2008 | McGrath | G09B 23/20 |
| | | | | 435/190 |
| 2009/0192873 | A1 * | 7/2009 | Marble | G06Q 20/10 |
| | | | | 705/14.1 |
| 2010/0004055 | A1 * | 1/2010 | Gormley | H04L 67/38 |
| | | | | 463/25 |
| 2010/0299260 | A1 * | 11/2010 | Thomas | G06Q 20/102 |
| | | | | 705/44 |
| 2012/0054680 | A1 | 3/2012 | Moonka et al. | |
| 2013/0138543 | A1 | 5/2013 | McMaster et al. | |
| 2014/0122324 | A1 | 5/2014 | Spier | |
| 2014/0156442 | A1 | 6/2014 | Cushing et al. | |
| 2014/0229397 | A1 * | 8/2014 | Fink | G06Q 30/0279 |
| | | | | 705/329 |
| 2014/0380508 | A1 * | 12/2014 | Cao | G06Q 20/386 |
| | | | | 726/28 |
| 2017/0024780 | A1 * | 1/2017 | Sobhani | G06Q 30/0207 |
| 2017/0046392 | A1 * | 2/2017 | Lilienthal | G06F 16/245 |
| 2017/0092021 | A1 * | 3/2017 | Nielsen | G05B 23/0283 |
| 2018/0227128 | A1 * | 8/2018 | Church | H04L 9/3247 |
| 2019/0385221 | A1 * | 12/2019 | Cen | G06Q 30/0641 |
| 2020/0387941 | A1 * | 12/2020 | Gassel | G06Q 20/40145 |
| 2022/0080962 | A1 * | 3/2022 | Bin-Nun | B60W 30/0956 |

* cited by examiner

SYSTEMS AND METHODS FOR PROCESSING CONTRIBUTIONS MADE TO PURCHASER SELECTED ORGANIZATIONS

TECHNICAL FIELD

The present disclosure generally relates to computerized methods and systems for the computation and distribution of contributions made to third-party organizations as part of financial transaction processing.

BACKGROUND

For decades, financial institutions have enticed individual account holders to engage in various rewards programs in order to provide an incentive to use the various instruments provided by the institutions. In some cases, account holders have been incentivized by offers from the financial institutions to donate amounts based on purchases to nonprofit or charitable organizations.

Another significant development is the "gamification" of various information processing systems. This phenomenon primarily consists of a system providing feedback based on an operator input that rates the overall interaction of the user with the system. This is typically achieved by showing a measure of completeness of a given process by a subject or indicating progressive scoring based on frequency and duration of users' interactions with a system.

A third recent situation is the advent of social media as realized by of multiple online systems enabling members to broadcast arbitrary information to wide audiences. In many cases, this includes achievements and accomplishments of the broadcaster in order to promote self-image and encourage or discourage certain behaviors in recipients of their broadcasts.

Despite these recent trends, their application to integrate reward programs with social media platforms remain difficult due to layers of encryption that protect underlying systems and databases as well as variability between different financial institutions and social media platforms. Therefore, there is a need for unique fusion of systems that facilitate interoperability of independent third-party systems for a robust flow of information that spans multiple platforms and tracks a variety of events that occur within each discrete platform.

SUMMARY

One aspect of the present disclosure is directed to a system comprising at least one memory containing instructions; and at least one processor configured to execute the instructions to perform operations. The operations may comprise: receiving, from a user device associated with a user, a first request to associate the user with a target and account information associated with the user; retrieving the target from a database to associate the user with the retrieved target; receiving, from an entity, event data associated with the account information; computing an amount of contribution based on the received event data; transmitting the computed amount of contribution to a distribution system configured to distribute the contribution to the associated target; updating the database by aggregating the computed amount of contribution to a stored contribution data associated with the user; retrieving pre-authenticated data of the user allowing transmission of a message to a public forum; generating the message based on the event data and the computed amount of contribution; and transmitting the message to one or more devices via the public forum.

Yet another aspect of the present disclosure is directed to a method comprising: receiving, from a user device associated with a user, a first request to associate the user with a target and account information associated with the user; retrieving the target from a database to associate the user with the retrieved target; receiving, from an entity, event data associated with the account information; computing an amount of contribution based on the received event data; transmitting the computed amount of contribution to a distribution system configured to distribute the contribution to the associated target; updating the database by aggregating the computed amount of contribution to a stored contribution data associated with the user; retrieving pre-authenticated data of the user allowing transmission of a message to a public forum; generating the message based on the event data and the computed amount of contribution; and transmitting the message to one or more devices via the public forum.

Other systems, methods, and computer-readable media are also discussed herein.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for the calculation and dissemination via public media of contributions made to purchaser selected organizations. The systems may be composed of several integrated elements: application-side code, external and internal gateways for routing inter and intranet service calls, identity processing, orchestration of requests, sets of microservices to process information, and long-term database storage. The disclosed embodiments may cover various functions such as processing requests to associate an account in a financial institution with a recipient organization such as a nonprofit or charitable organization; handling transaction completion from a financial institution and aggregating a specified portion of the transaction to a running total of contributions to the recipient organization; and retrieval of aggregate contributions and posting them to supported social media platforms.

While systems already exist using rewards and incentives to drive behavior, the disclosed embodiments extend gamification through the broadcast of metrics via online forums. Given a financial institution seeking to promote its services, the embodiments described herein encourage its members to engage in use of products in order to elevate scoring based on contributions made to a charitable organization. In turn, this score may be broadcast via online forums such as social media in order to promote engagement with the organization and financial institution enabling the contributions. The configuration of systems described below enable such promotion and gamification of services through a unique fusion of systems that tracks a variety of events across multiple independent platforms.

Figure 1:
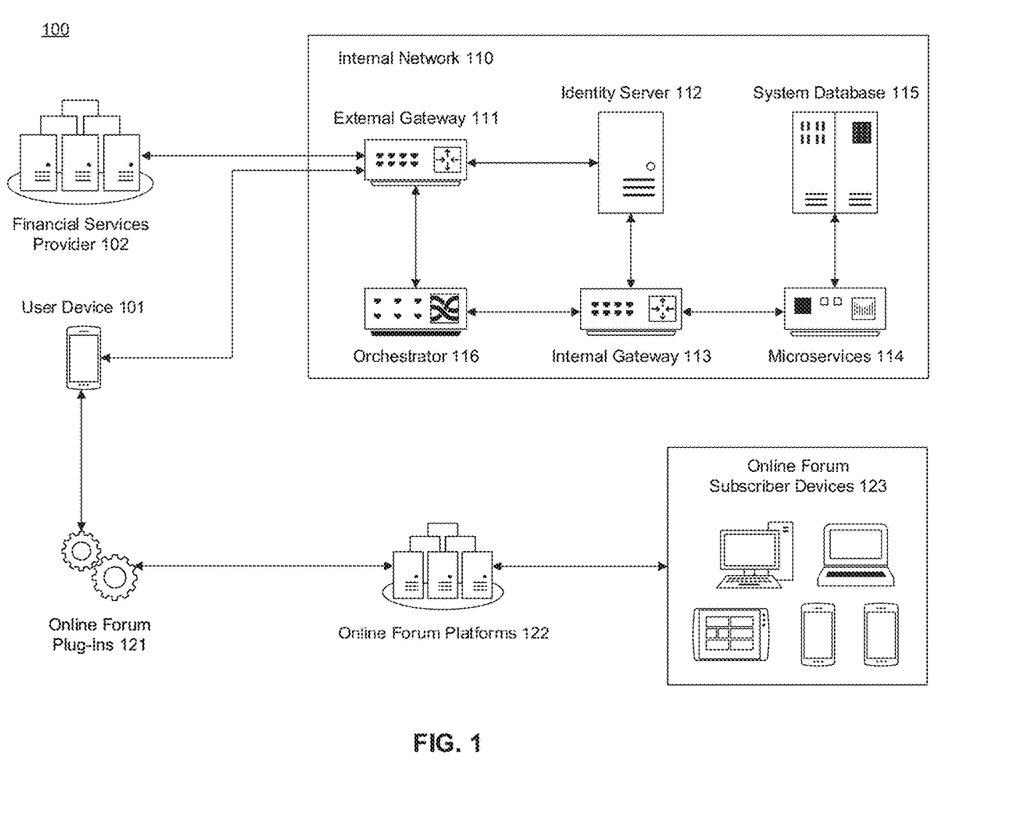
FIG. 1 is a schematic block diagram illustrating an exemplary embodiment of a networked environment comprising computerized systems for interfacing multiple independent platforms to track and promote activities, consistent with the disclosed embodiments.

FIG. 1 is a schematic block diagram illustrating an exemplary embodiment of a networked environment 100 comprising computerized systems for interfacing multiple independent platforms to track and promote activities.

Networked environment 100 may comprise a variety of computerized systems, each of which may be connected to one another via one or more networks. For example, the depicted systems include a user device 101, financial services provider 102, an internal network 110, online forum plug-ins 121, online forum platforms 122, and online forum subscriber devices 123. In some embodiments, each of the elements depicted in FIG. 1 may represent a group of systems, individual systems in a network of systems, functional units or modules inside a system, individual devices, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11 Standards, a cellular network (e.g., 4G, LTE, or 5G), a wired network, or the like. The individual systems can also be located within one geographical location or be geographically dispersed.

User device 101, in some embodiments, may be any personal computing device configured to access internal network 110 via network connections such as a cellular network or a wireless network compliant with the IEEE 802.11 Standards. While a smartphone is depicted as an example, user device 101 may be a cellphone, a tablet, a computer, a laptop, or the like, with which an account holder can access internal network 110.

In some embodiments, user device 101 may be configured to display a user interface for receiving various user inputs, including but not limited to selecting an organization to be associated with or sharing information for transmission to another system or network. In further embodiments, user device 101 may also be configured to receive, generate, or display notifications for reminding a user to perform certain tasks (e.g., reminding to enroll into an organization) or for informing the user of an event (e.g., notifying that a contribution is made)

Financial services provider 102, may refer to a collection of networked computing devices or networks that provide a connectivity infrastructure for enabling communication among various entities and financial transaction systems to process transactions and/or fund transfers. In some embodiments, financial services provider 102 may be an Interbank Network (such as NYCE®, INTERAC®, or the like). For example, financial services provider 301 may receive debit transactions such as when an account holder purchases an item using a debit card associated with a user account stored at system database 115. In other embodiments, financial services provider 301 may receive transfer transactions such as when an account holder transfers or deposits an amount from or to a user account stored at system database 115.

Internal network 110, in some embodiments, may be a group of systems comprising an external gateway 111, an identity server 112, an internal gateway 113, microservices 114, a system database 115, and an orchestrator 116, each of which may be connected to one another via one or more networks enumerated above. In some embodiments, the group of systems comprising internal network 110 may be owned and operated by a private entity such as a financial institution to enable communication with user devices (e.g., user device 101) of account holders or systems of other financial services providers.

External gateway 111, in some embodiments, may include one or more computing devices configured to accept incoming communications from user device 101 and relay them to appropriate systems through processes described below with respect to FIGS. 2, 4, and 6. Internal gateway 113, in some embodiments, may be similar to external gateway 111 except that internal gateway 113 serves as a relay for communications among the systems in internal network 110.

In some embodiments, the incoming communications from user device 101 may include various requests with respect to the user account associated with user device 101. For example, incoming communications may include a request to associate the user account with a recipient organization or a request to retrieve certain information related to the user account, which are described below in more detail.

In further embodiments, external gateway 111 may also be configured to accept incoming communications from financial services provider 102. For example, financial services provider 102 may generate and transmit a request to make a contribution based on one or more underlying events such as debit transactions or transfer transactions. Identity server 312, internal gateway 313, microservices 314, and system database 315 may be configured to validate the request as described above with respect to FIGS. 1 and 2.

Identity server 112, in some embodiments, may include one or more computing devices configured to collect, organize, and store information related to account holders and their accounts. For example, identity server 112 may comprise any combination of non-transitory storage media such as hard disk drives, solid state drives, and the like. In some embodiments, identity server 112 may store a list of user accounts (e.g., checking accounts, savings accounts) at a bank and identifying information such as login credentials, account identifiers, a list of user devices previously authenticated for the user accounts, and the like. All information stored in identity server 112 may be protected by multiple levels of encryption. In some embodiments, the encryptions may comprise, for example, using symmetric or asymmetric encryptions to secure communications between any pair of systems, using hash functions to confirm user credentials, and/or using volume encryptions to secure data stored in non-transitory computer-readable mediums. In further embodiments, the encryptions may use pseudo-random encryption keys of different lengths (e.g., 128-, 256-, 1024-, 2048-bit, or any longer bit length keys) and algorithms such as advanced encryption standard (AES), transport layer security (TLS), secure socket layer (SSL), or any other standard encryption algorithms.

Microservices 114, in some embodiments, may include one or more computing devices configured to receive internal requests, modify corresponding data record stored in system database 115, or transmit requested information based on the corresponding data record. For example, microservices 114 may be configured to process incoming validation requests and return a value indicating whether the validation was successful or not. Such validation requests may comprise, for example, determining whether a user is permitted to make certain modifications to his or her account, or determining whether the account has enough funds to tender a transaction. In another example, microservices 114 may also be configured to process incoming action requests to modify a corresponding data record stored in system database 115 or to retrieve certain information regarding an account. Such action requests may comprise, for example, associating a user account with an organization, or returning a total contribution amount made by a user account. In further embodiments, microservices 114 may be integrated into system database 115 while still providing functionalities similar to those described above.

System database 115, in some embodiments, may include non-transitory storage media such as hard disk drives, solid state drives, and the like, configured to store information related to user accounts. By way of example, system database 115 may include Oracle databases, Sybase databases, or other relational databases or non-relational databases, such as Hadoop sequence files, HBase, or Cassandra.

In some embodiments, system database 115 may serve as a central database where all information pertaining to user accounts are stored, as opposed to identity server 112, which only stores information pertaining to verifying identity of user accounts and devices. For example, system database 115 may store, in addition to the list of user accounts and identifying information stored in identity server 112, account details such as current balance, user permissions, associated recipient organizations or social media accounts, and the like.

Furthermore, system database 115 may also be configured to store non-user account information such as information related to recipient organizations. Such organization account information may include, for example, details of the corresponding organization, total amount of contribution aggregated from different user accounts, history of contributions from user accounts and their contribution amounts, and the like.

Orchestrator 116, in some embodiments, may include one or more computing devices configured to receive incoming communications from user device 101 via external gateway 111 and perform appropriate actions. The communications may have been authenticated and/or validated through identity server 112, internal gateway 113, and microservices 114 before they are received and processed by orchestrator 116. Orchestrator 116 may then process the communications from user device 101 to generate and relay an appropriate action request to microservices 114. In some embodiments, the action requests may include, for example, a request for associating a user account with a recipient organization by modifying a data record stored in system database 115 or retrieving information related to a user account or a recipient organization account from system database 115.

In further embodiments, the action requests may also include, for example, determining a contribution amount based on the underlying events and modifying corresponding data records in system database 315 to reflect the new contribution. The process of determining the contribution amount is described below in more detail.

Online forum plug-ins 121, in some embodiments, may include computer-programmable instructions such as software development kits (SDK) or application programming interfaces (API) that allow user device 101 to access online forum platforms 122. In some embodiments, online forum plug-ins 121 may include instructions for interfacing with internal systems of online forum platforms 122. For example, online forum plug-ins 121 may allow user device 101 to retrieve authentication data for accessing online forum platforms 122 or generate and publish postings on online forum platforms 122.

Online forum platforms 122, in some embodiments, may include a social networking service (SNS) or discussion board where users can publish various information as postings and others can read, interact, and share the postings via online forum subscriber devices 123. In some embodiments, online forum platforms 122 may allow any number of people to share information or interact with each other. Such activities may be for pleasure or a cause such as donating to an organization for a common cause.

Online forum subscriber devices 123, in some embodiments, may be any personal computing device configured to access internal systems of online forum platforms 122 like user device 101. Online forum subscriber devices 123 may include any device suitable for connecting to the Internet and receiving user input, such as a cellphone, a tablet, a computer, a laptop, or the like.

Figure 2:
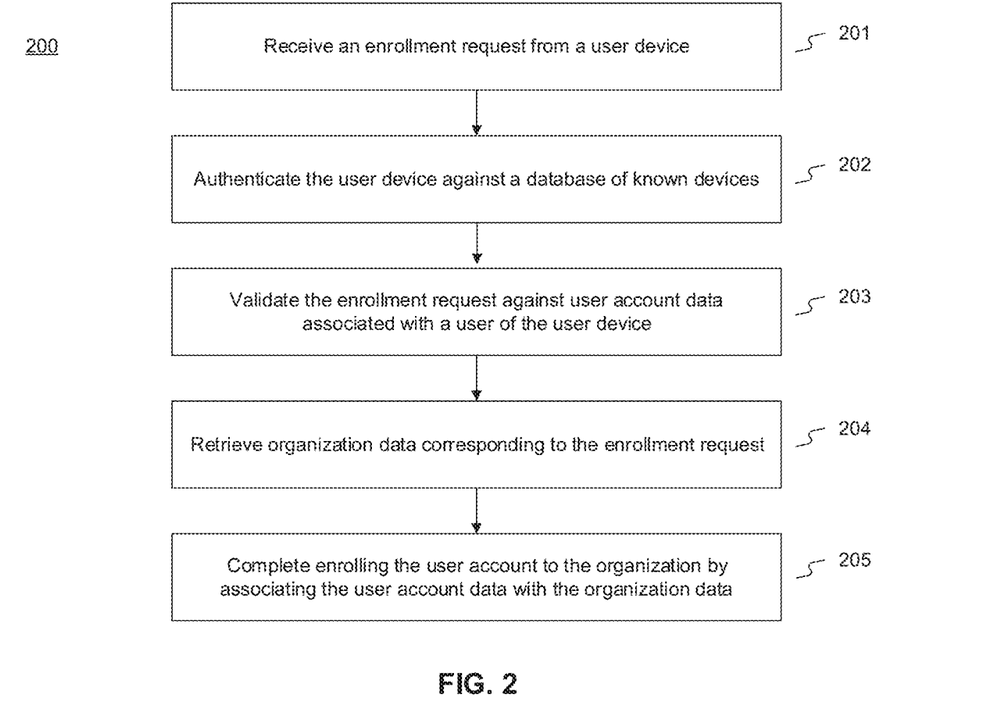
FIG. 2 is a flowchart of an exemplary computerized process for associating a user account with a recipient organization, consistent with the disclosed embodiments.

FIG. 2 is a flowchart of an exemplary computerized process 200 for associating a user account with a recipient organization. As used herein, enrolling a user account to an organization or associating the user account with the organization may refer to modifying a data record of a user account to be associated or linked to a data record of a particular organization. The organization may be a business entity, a group, or an individual registered to receive monetary contributions from user accounts. Once a user account is associated or enrolled with an organization, future contributions generated by the account holder of the user account may be added to an account of the organization, where the aggregated contribution may eventually be transferred to the organization. In some embodiments, the organization may be a non-profit, charity, non-governmental organization, or the like that advocates for a particular cause.

In some embodiments, process 200 may be performed by internal network 110 using its subsystems (e.g., external gateway 111, identity server 112, internal gateway 113, microservices 114, system databases 115, and orchestrator 116) with the corresponding functions described above with respect to FIG. 1. While process 200 is described below with reference to specific subsystems of internal network 110, it should be understood that process 200 may be performed by a single system encompassing functions of each subsystem or a plurality of systems configured to include functions of any combination of the subsystems.

At step 201, external gateway 111 may receive an enrollment request from user device 101. Additionally or alternatively, user device 101 may be configured to determine that the corresponding user account is not enrolled into any organization and generate a notification for the user, reminding the user to enroll into an organization. The enrollment request received by external gateway 111 may have been in generated in response to such notification.

In some embodiments, the enrollment request may be a data communication between user device 101 and external gateway 111 containing information necessary to associate a user account of the user of user device 101 with a recipient organization. In some embodiments, the enrollment request may comprise various identifying information such as the identity of user device 101 and the identity of the user and/or the user account, as well as substantive information such as the identity of the organization to which the user wishes to enroll. For example, the identity of user device 101 may comprise any one or more of the user device's MAC address, IP address, or any packet of data able to uniquely identify user device 101.

In some embodiments, external gateway 111 may generate an authentication request in response to receiving the enrollment request. The authentication request may be a data communication to identity server 112 for verifying that the user that sent the enrollment request is indeed the expected user of user device 101 (e.g., the rightful owner instead of a malicious hacker) and that the user is authorized to enroll into the desired organization.

At step 202, identity server 112 may, in response to the authentication request, authenticate user device 101 against a database of known devices stored in identity server 112 and previously authenticated for the user. Alternatively, when user device 101 does not match any of the known devices for the user, identity server 112 may try to authenticate user device 101 by sending a signal to the user through other, previously-authenticated means such as a text message to the user's mobile phone, an email, a call, or a message to a previously-authenticated device.

Having authenticated that the user behind user device 101 is the expected owner, identity server 112 may, via internal gateway 113, forward a validation request to microservices 114. At step 203, microservices 114 may process the validation request against user account data associated with the user and stored in system database 115. In some embodiments, validation request may comprise user identity suitable for identifying the user account associated with the user and/or the organization identity for identifying the organization that the user wishes to enroll. Microservices 114 may use such information, for example, to look up the user account in system database 115, verify the user's permissions with respect to modifying different aspects of the user account, and/or confirm whether all requirements for enrolling into an organization are met.

Once the authentication request is verified and validated, microservices 114 may relay the completed authentication request to external gateway 111. In response, external gateway 111 may then generate an action request for processing the enrollment request received from user device 101 at step 201. The action request, in some embodiments, may comprise instructions for associating a user account with an organization and identifying information for the user account and the organization as described above. In some embodiments, external gateway 111 may transmit the action request to orchestrator 116 for further processing, which may then be transmitted to microservices 114 via internal gateway 113.

At step 204, microservices 114 may retrieve organization data corresponding to the action request generated from the enrollment request. In some embodiments, microservices 114 may query system database 115 to identify the organization data corresponding to organization associated with the action request.

At step 205, microservices 114 may enroll the user account associated with the action request and thus user device 101 to the organization by associating the user account with the organization data. The modified user account updated to be associated with the organization data may be overwritten into system database 115 to complete the enrollment process.

In further embodiments, a reverse of process 200 for unenrolling a user account from an organization may be implemented in a manner similar to process 200. More specifically, an unenrollment request from user device 101 may comprise data (e.g., identifying information and substantive information as described above) similar to those contained in the enrollment request at step 201. In this embodiment, however, the unenrollment request may comprise instructions to dissociate the user account from the organization.

Furthermore, in some embodiments, the enrollment request may specify more than one organization for association with a user account, or an additional enrollment request may specify one or more organizations even when an organization is already associated with a user account. In such cases, orchestrator 116 and microservices 114 may associate the user account with all or a subset of the organizations so that the user account is associated with more than one organization. Any subsequent contribution amount may be split among the associated organizations based on rules described below in more detail.

Figure 3:
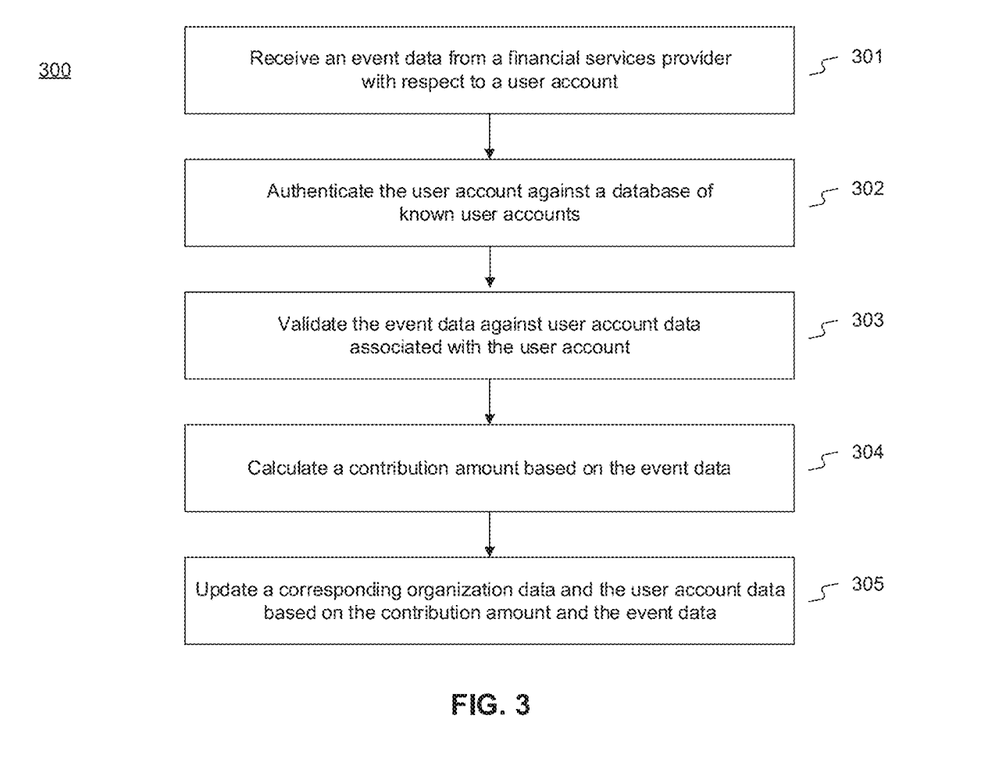
FIG. 3 is a flowchart of an exemplary computerized process for computing and aggregating a contribution amount, consistent with the disclosed embodiments.

FIG. 3 is a flowchart of an exemplary computerized process 300 for computing and aggregating contribution amounts. In some embodiments, process 300 may occur only after a user account has been associated with an organization in a process similar to process 200 described above with respect to FIG. 2. In other embodiments, process 300 may occur regardless of whether the user account is associated with an organization. In this instance, the contribution amounts may be deferred or aggregated until the user account is associated with one or more organizations. Still further, in some embodiments, orchestrator 116 may initiate process 300 from step 304 in response to certain pre-specified trigger events to determine a contribution amount and proceed to step 305. The pre-specified trigger events are described in more detail below.

In some embodiments, process 300 may be performed by internal network 110 using its subsystems (e.g., external gateway 111, identity server 112, internal gateway 113, microservices 114, system databases 115, and orchestrator 116) with the corresponding functions described above with respect to FIG. 1. While process 300 is described below with reference to specific subsystems of internal network 110, it should be understood that process 300 may be performed by a single system encompassing functions of each subsystem or a plurality of systems configured to include functions of any combination of the subsystems.

In some embodiments, steps 301-303 may be similar to steps 201-203 described above with respect to FIG. 2 except that an event data is received from financial services provider 102 instead of an enrollment request from user device 101 as in step 201. Therefore, the steps of verifying and validating an authentication request (i.e., steps 302-303) in response to the event data are not repeated herein. In some embodiments, event data may include, for example, financial transaction data, event occurrence data, or any data suitable for calculating a contribution amount to an organization associated with a user account. Additionally or alternatively, in other embodiments where the event data is received from user device 101, steps 201-203 may replace steps 301-303 to authenticate and validate the event data and user device 101. The event data may then be routed and processed by internal network 110 through a process similar to the rest of process 300 described below.

At step 301, external gateway 111 may receive an event data from financial services provider 102. As used herein, the event data may refer to any type of data generated by financial services provider 102 in response to an event involving a user account. In some embodiments, the event may include monetary transactions processed by financial services provider 102, in which case the event data may include identifying information and substantive information related to the event. For example, the identifying information may comprise the identity of the user account involved in the monetary transaction, and the substantive information may comprise details of the event, such as financial transaction data, event occurrence data, or any data suitable for calculating a contribution amount to an organization associated with the user account.

In some embodiments, external gateway 111 may generate an authentication request in response to receiving the enrollment request. The authentication request may be a data communication to identity server 112 for verifying that the event data indeed came from financial services provider 102 instead of a fraudulent entity (e.g., hacker) and that the user account indeed an account stored in system database 115.

At step 302, identity server 112 may, in response to the authentication request, authenticate financial services provider 102 against a database of known financial services providers stored in identity server 112.

Having authenticated the identity of financial services provider 102, identity server 112 may, via internal gateway 113, forward a validation request to microservices 114 for validating the identity of the user account. At step 303, microservices 114 may process the validation request against user account data stored in system database 115. In some embodiments, validation request may comprise details of the user account involved in the event. Microservices 114 may use such information, for example, to look up the user account in system database 115 and/or verify that the user account may make contributions to an organization.

Once the authentication request is verified and validated, microservices 114 may relay the completed authentication request to external gateway 111. In response, external gateway 111 may then generate and transmit an action request for processing the event data received at step 301. The action request, in some embodiments, may comprise the event data in order to determine the contribution amount.

At step 304, orchestrator 116 may receive the action request and calculate a contribution amount based on the event data. There may be several different mechanisms by which orchestrator 116 may determine contribution amounts. In some embodiments, orchestrator 116 may determine which of the mechanisms to follow based on the type of data included in the event data. Specific embodiments of the event data and corresponding algorithms for calculating the contribution amount are described below in more detail. Once the contribution amount is determined for a particular event data, orchestrator 116 may generate an action request for adding the contribution amount to an aggregate contribution amount associated with the organization associated with the user account.

At step 305, microservices 114 may receive the action request and update a corresponding organization data and the user account data based on the contribution amount and the event data. More specifically, microservices 114 may query system database 115 to identify and retrieve a user account data associated with the event data (e.g., the user account belonging to the user that triggered the generation of the event data) and the organization data associated with the user account. Microservices 114 may then add the contribution amount to the aggregated amount in the organization data to reflect that the total contribution amount for the corresponding organization is increased by the contribution amount from the user account. Microservices 114 may also subtract the contribution amount from the balance in the user account data to reflect that the user account used a portion of its balance to contribute to the corresponding organization.

In some embodiments, such increase and decrease in the amounts may represent an actual transfer of money from the user account to the organization's account. In other embodiments, microservices 114 may transmit the details of the contribution to a financial transaction system that is configured to effectuate the actual transfer of money at each contribution or at certain intervals such as once every month, every quarter, or any similar unit of time. Additionally or alternatively, the contributed amounts may be deducted from a financial institution instead of a user account. In such embodiments, the contribution amount may be equivalent to a portion of a transaction fee that the financial institution is entitled to collect.

Furthermore, microservices 114 may also update a record associated with the user account in order to generate a history of contributions. In some embodiments, a user may be able to retrieve such record via user device 101 and, for example, use it to prepare a tax return or extract any pertinent information to be shared on a social media platform.

In further embodiments, some contribution amounts may include a negative value where the event data corresponds to an event that cancels an earlier event in full or in part. For example, orchestrator 116 may determine a negative contribution amount when the event data corresponds to a cancellation of a contribution, return of a purchase, or the like. In this case, microservice 114 may decrease the aggregated amount of the corresponding organization and/or increase the balance in the user account by the contribution amount.

Figure 4:
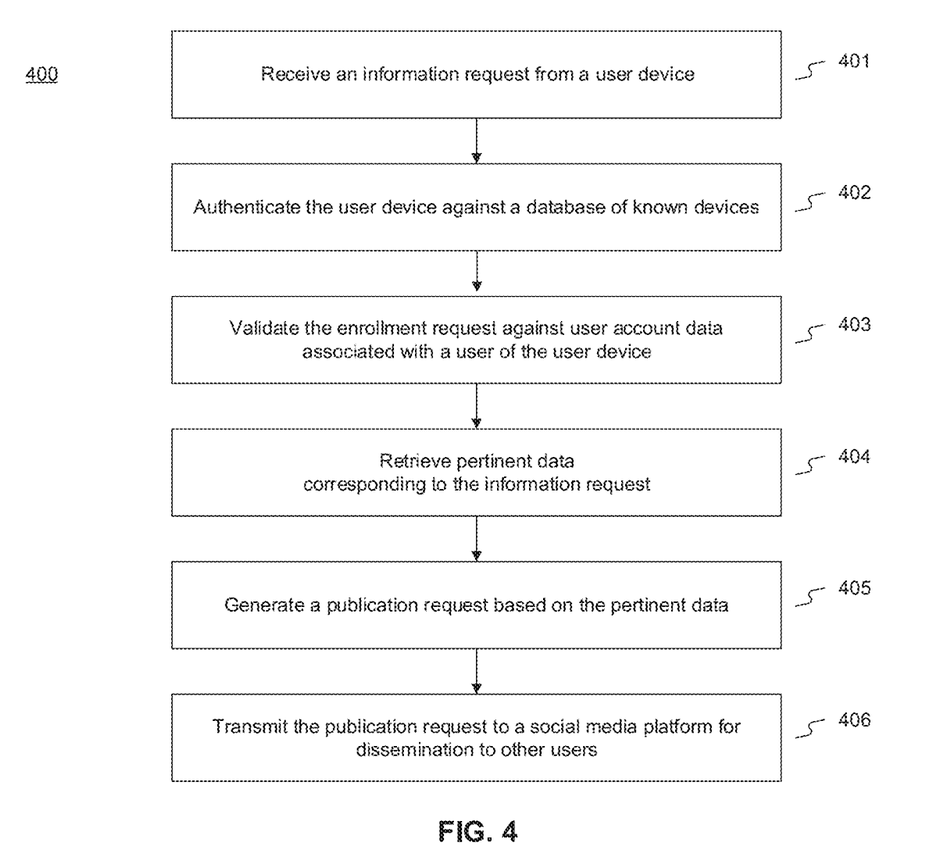
FIG. 4 is a flowchart of an exemplary computerized process for disseminating information via online forums, consistent with the disclosed embodiments.

FIG. 4 is a flowchart of an exemplary computerized process 400 for disseminating information via online forums. In some embodiments, process 400 may be performed by internal network 110 using its subsystems (e.g., external gateway 111, identity server 112, internal gateway 113, microservices 114, system databases 115, and orchestrator 116) with the corresponding functions described above with respect to FIG. 1. While process 400 is described below with reference to specific subsystems of internal network 110, it should be understood that process 400 may be performed by a single system encompassing functions of each subsystem or a plurality of systems configured to include functions of any combination of the subsystems.

In some embodiments, steps 401-403 may be similar to steps 201-203 described above with respect to FIG. 2 except that an information request is received from user device 101 instead of an enrollment request as in step 201. Therefore, the steps of verifying and validating an authentication request (i.e., steps 402-403) in response to the event data are not repeated herein. In some embodiments, the information request may be configured to determine and/or retrieve an information from system database 115 such as a total contribution amount of an organization, a total contribution amount made by a user, the name of the organization associated with a user, or any other information that can be deduced from the records stored in system database 115.

At step 404, in response to a verification and validated authentication request, orchestrator 116 may generate an action request for requesting the information from system database 115. In some embodiments, orchestrator 116 may transmit the action request to microservices 114 via internal gateway 113. Microservices 114 may then retrieve pertinent data corresponding to the requested information, and return the pertinent data to orchestrator 116.

At step 405, user device 101 may receive the pertinent data and generate a publication request based on the pertinent data and the requested information. In some embodiments, the publication request may comprise any image, video, or textual data designed to communicate a message from the user about the requested information. For example, the publication request may comprise a message containing the total aggregated amount by the user to an organization along with a message to encourage more contribution. In another example, the publication request may comprise an image of the organization's logo and a video file promoting the organization. In yet another example, the publication request may comprise information pertaining to either currently associated organization or any prior organizations without affecting the current association. Still further, the publication request may comprise a message indicating a contribution amount and the event that lead to the contribution (e.g., donating $5 signing up for a new service). In further embodiments, the publication request may include prespecified information or contents configured to be published in response to simple user inputs received via user device 101 or configured to be published automatically according to a schedule.

At step 406, user device 101 may transmit the publication request to online forum platform 122 by using online forum plug-ins 121. Online forum plug-ins 121 may be any plug-in, API, or a series of computer-executable instructions that enable third party devices such as user device 101 to communicate with online forum platforms 122 and publish new postings. Once published, posting may be disseminated throughout online forum platforms 122 and be accessible to other user devices in a relationship with user device 101.

More specifically, transmitting the publication request may include, for example, generating a link to be shared on online forum platforms 122, generating a message or an email containing the posting for dissemination to contacts stored in user device 101, generating a message to other account holders through their respective identifiers (e.g., tags, ID), or transmitting the publication request to multiple online forum platforms 122 using appropriate methods (e.g., APIs customized to each online forum platform).

In further embodiments, user device 101 may automate transmitting the publication request to promote consistent publication activities. For example, user device 101 may display or highlight a button or a similar user interface element that transmits a publication request with prespecified contents (e.g., message, multimedia, or links). Additionally or alternatively, user device 101 may transmit a publication request at a predefine interval or according to a predefined schedule.

The different mechanisms by which orchestrator 116 may determine contribution amounts in connection with step 304 are described below. In general, the mechanism may be defined by the relationship between an account holder (i.e., the user of user device 101), the organization associated with the user account of the account holder, and the underlying event that gave rise to the event data processed by orchestrator 116 at step 304. In some embodiments, the relationship may be defined by three types of variations that can occur, where orchestrator 116 may determine the types and corresponding variations based on the substantive information included in the event data.

One taxonomy may categorize these types of three primary axes as one of three forms: models, events, or rules. A given scenario for contributing an amount to an organization may be defined by a combination of values on each axis. Or put another way, one or more values from each axis can be combined to define an embodiment of an algorithm for determining a contribution amount. For example, a model (e.g., Spend model) from the model axis, an event (e.g., Transaction event) from the event axis, and a rule (e.g., Basis rule) from the rule axis can be combined to for an algorithm that calculates a contribution amount based on percentage of an amount a user spent at a third party store that's recorded in system as a purchase transaction. Each possible value of the three axes (i.e., the models, events, and rules) are described below in more detail.

One of the axes may be based on the processing model. As used herein, a processing model may refer to an interaction between an account holder (i.e., the user of user device 301) and the user account. Models may refer to patterns describing the intersection of compatible events and rules that dictate how a contribution amount is calculated. Models may encapsulate the combinations of valid rules and compatible events. In some embodiments, models may be mutually exclusive, and there may be no restriction to the number of model, event, and rule combinations that give rise to a particular event data for calculating a contribution amount.

In some embodiments, one of the models may be called a "Spend" model. A Spend model may capture when an account holder makes a purchase that results in transfer of funds from the underlying user account to a third-party vendor, merchant, or any entity that accepts a payment for goods or services. In this embodiment, the value of the transfer may be used for calculating the contribution amount, but the account holder or a financial institution processing the transfer may elect a fixed contribution amount or other rule (e.g., rounding-up) to apply. Possible variations of the rule are described below in more detail.

Another model may be called a "Deposit" model. A Deposit model may result when a third-party transfers funds into the underlying user account stored in system database 315. In some embodiments, the amount of the transfer may be used for the calculation of the contribution amount as with the Spend model. Other rules such as fixed amount or rounding-up may also be supported in the Deposit model.

Another model may be called a "Program" model. A Program model may occur when the account holder reaches a level of eligibility for a given program offered by a financial institution. Once the account holder has enrolled, a predetermined amount, either fixed or based on the value of the account, may be used as a basis for calculating the contribution amount. Alternatively, the contribution amount may be determined once the eligibility is met. In some embodiments, the given program may include, for example, a special promotion by a financial institution that contributes an additional amount during a particular period.

Another model may be called a "Direct" model. A Direct model may occur when an account holder chooses to directly contribute to an organization, transferring a portion of the balance of the underlying user account to the organization.

Another model may be called an "Activity" model. An Activity model may determine the contribution amount based on the number of deposits or withdrawals made to an underlying account over a predetermined period of time. In some embodiments, the Activity model may be used to promote account holders to maintain a minimum level of activity or to remain below a maximum occurrence.

Another model may be called a "Task" model. In a Task model, the account holder may be requested to perform a task. Once the account holder completes or starts the task, a contribution amount may be determined and transferred to the organization. The task may include, for example, signing up for e-mail alerts, inviting other people to join in a program, or any other tasks that an account holder may perform with relatively small effort.

Another model may be called a "Status" model. A Status model may apply when a change to a user account not covered under the Task model leads to a change in the account status. For example, an event under a Status model may include having a balance, account spending, or savings over or under a given threshold for a period of time. Alternatively, a financial institution may offer a free contribution to promote ongoing enrollment in programs sponsored by the financial institution.

Yet another model may be called a "Deferred" model. A Deferred model may rely on the account holder to establish a temporary account for aggregating his or her contributions into a separate ledger, which is not contributed until the account holder approves. In this way, the contribution amounts stored in the temporary account are deferred for contribution at a time in the future. In some embodiments, the contribution amounts may be deferred until one or more conditions are met. For example, the Deferred model may be used when contributions are conditioned upon accruing a certain amount within a given period of time. Once all conditions are met, aggregated contribution amounts are transferred to an associated organization at a time in accordance with other constraining rules, such as only at midnight, once a month, or the like.

In some embodiments, another one of the axes may be based on the event which triggers generation of an event data. An event may be initiated by the account holder of a user device, a financial institution, or an administrator of internal network 310.

One of the events that trigger the generation may include a "Transaction" event. A Transaction event may capture a transfer of funds between the user account of the account holder and the account of another entity such as a vendor or a merchant that provides goods or services in return for payment. In some embodiments, only those transactions that have been processed by financial services provider 301 and settled. As used herein, the transfer of funds may be bidirectional, where both credit and debit transactions that transfers an amount into and out of a user account may result in a positive contribution amount (i.e., donating to the associated organization). In other embodiments, debt transactions with certain entities may result in a positive contribution amount, while credit transactions with the same entities may result in a negative contribution amount (e.g., retracting all or a portion of previously donated amount), or vice versa.

Another event may include a "Share" event, which may occur when an account holder publicizes his or her interaction with a organization through a forum. In some embodiments, the forum may include online forums such as social media platforms, bulletin boards, or SNS. An exemplary Share event may include a user choosing to post some information to an online forum or an enrollment of a user account through a referral. Other examples may include messaging a fellow member of a forum, sending a tweet, or "liking" a post.

Additionally or alternatively, a Share event may use deep links to track interactions that a post receives (e.g., number of views, "likes," or comments) and use the level of interactions to determine a contribution amount. More specifically, orchestrator 116 may be configured to be in communication with online forum platforms 122 through online forum plug-ins 121, whereby orchestrator 116 may detect when certain conditions (e.g., increased view/share count, sending a message, new incoming interaction from any online forum subscriber device 123, or any such definable condition that involve the user account or the associated organization) arise.

Another event may include a "User" event. A User event may occur when an account holder takes an action with a prescribed significance with respect to a program offered by a financial institution. For example, a User event may include enrolling in or qualifying for a loyalty program, inviting other account holders to participate in a program, generating a number of page views, or downloading a particular application of an affiliate entity.

In further embodiments, a User event may also include when a new user is acquired through a unique link generated for a particular account holder. More specifically, an account holder may use user device 101 to request a link from orchestrator 116, through which a new customer may sign up for a program. The link may uniquely identify the account holder as being the referrer of the new customer, and a contribution may be made for the account holder in return for the new customer's sign up.

Another event may include a "Schedule" event, which may occur when a predetermined time has passed since a particular event. The particular event may be any of the events described above and may have been performed by any of the account holder, financial institution, or one or more systems in internal network 310. In some embodiments, Schedule events may be periodic, one-time only, or coincident with holidays or seasonal events.

Another event may include a "Balance" event, which occurs when the amount of funds available to the user exceeds or falls under predetermined thresholds. In some embodiments, the predetermined threshold may be adjustable by the account holder, the financial institution, or the administrator.

Still further, in some embodiments, another axis may include application of certain rules in determining the contribution amounts. For any given combination of model and event, a single or a plurality of rules may apply, where the rules may be given discrete inputs from corresponding events and the model may apply the rules in whatever precedence defined by the model.

One of the rules may include a "Basis" rule, where the contribution amount may be calculated based on an amount multiplied by the value of a basis point for an organization. In some embodiments, the contribution amount may be equivalent to a portion of a transaction fee financial institutions receive from a transaction. For example, an exemplary rule may dictate that 100 basis points will apply to certain type of transaction to determine a contribution amount from the transaction.

Another rule may include a "Fixed" rule, where the contribution amount may be a fixed amount regardless of the amount that triggered an event. In some embodiments, the fixed amount may be adjustable by the account holder or the financial institution.

Another rule may include a "Rounding" rule, which may round either or both the amount that triggered an event or the calculated contribution amount to a fixed increment (e.g., nearest dollar or nearest five-dollar increment). For example, a Rounding rule may round the transaction amount that triggered an event and apply a Basis rule to calculate the contribution amount. Some Rounding rules may include either rounding up or down to the fixed increment. In other embodiments, a Rounding rule may round up the triggering amount to a fixed increment and determine the contribution amount by subtracting the triggering amount from the rounded amount (e.g., when a transaction is $12.05 and the amount is rounded to the nearest dollar, $0.95 is determined as the contribution amount).

Another rule may include an "Average" rule, which may determine a contribution amount based on an average amount of transactions over a time period. For example, an Average rule may determine a contribution amount based on an average balance of a user account over a period of time.

Another rule may include an "Interest" rule, which may determine a contribution amount based on an amount of interest that a user account has accrued. For example, orchestrator 116 may determine a contribution amount as a percentage of interest earned by a savings account over a period.

Another rule may include a "Threshold" rule, which may apply different rules based on whether one or more threshold is reached. For example, a mechanism for calculating a contribution amount may apply a Basis rule for an event when the amount associated with the event is greater than a threshold and apply a Fixed rule for the same event when the amount is less than or equal to the threshold. The behavior described in this example is only illustrative of a possible Threshold rule, and there may be more than one threshold, where each range delineated by the thresholds may adopt a different rule.

Another rule may include a "Velocity" rule, where the contribution amount is determined based on the frequency in which a given user account interacts with an organization. In some embodiments, a Velocity rule may be used to increase or decrease contribution as the number of interactions change. For example, a Velocity rule may set a maximum number of contributions that can be triggered by a certain type of event, thereby throttling the number of contributions for frequently repeated interactions.

Another rule may include an "Aggregate" rule, which may apply when a plurality of models are used to determine a contribution amount. In some embodiments, an Aggregate rule may be used to determine a contribution amount based on a series of events triggered by the account holder or the financial institution or other triggers set up by an administrator.

Another rule may include a "Caps" rule, which may limit a maximum aggregate amount and/or frequency of contributions from a user account. In some embodiments, the maximum amount or the frequency may be adjustable by the account holder, the financial institution, or the administrator.

Another rule may include a "Split" rule, which may divide portions of a contribution among a plurality of organizations. In some embodiments, the split may be evenly distributed among the plurality of organizations or be skewed in favor of one or more organizations.

Another rule may include a "Category" rule, which may specify a rule (e.g., a Basis rule or a Fixed rule) based on the type of a transaction. For example, the type of transaction may specify any number of distinguishable feature of a transaction such as a particular vendor, a category of goods or services, or a payment method (e.g., a credit card issued by an affiliate financial institution).

Another rule may include a "Duration" rule, which may combine with other rules to determine a contribution amount for an event that spans a specific range of time. The range of time may be adjustable or variable depending on the implementation. For example, a Duration rule may impose a specific period (i.e., time box), where transactions made during the specific period qualify for a higher contribution multiplier.

Another rule may include an "Elapsed" rule, which may be an extension of a Duration rule by determining the contribution amount based on how long a user account has maintained a particular status. For example, an Elapsed rule may determine a contribution amount based on a user account that remained enrolled to a program over the course of a month or a similar time period. In another example, an Elapsed rule may prompt orchestrator 116 to determine a contribution amount only after a certain period have passed since a previous status (e.g., staying enrolled for a month, qualifying for another contribution after a month).

Another rule may include a "Deferred" rule, where an account holder may have elected to hold contributions in a form of escrow for disbursement at another point in the future. In some embodiments, the deferred contributions may accrue over time until the account holder selects one or more organizations to contribute to. Additionally or alternatively, the account holder may be able to specify an organization for each contribution amount or a group thereof or specify a temporary organization to contribute to without dissociating from the currently associated organization.

Another rule may include a "Random" rule, which uses a pseudo-random number generator with or without specified conditions to determine a contribution amount or one or more contributions of a certain amount over time.

Another rule may include a "Lotto" rule, where a contribution may be made at a random interval or at an arbitrary number of activities or types of activities for a given user account. For example, a Lotto rule may determine and make a contribution, on average, at every fifth transaction to a particular vendor.

While a variety of models, events, and rules are described above, the particular models, events, and rules are only intended to be illustrative of possible variations and combinations of mechanisms for determining a contribution amount. It is to be understood that variations or combinations of the models, events, and rules, as well as other models, events, and rules are within the scope of the disclosed embodiments.

Exemplary combinations of models, events, and rules are described below. The combinations are intended only to demonstrate the variety of possible combinations and not to be limiting. Other combinations of models, events, and rules are also equally within the scope of the disclosed embodiments.

In some embodiments, the Spend model may be based on a single event—a Transaction event. The number of potential rules applied, however, is varied and may include the following: Basis, Fixed, Threshold, Velocity, Caps, Aggregate, Split, Duration, Elapsed, Average, Category, Rounding, and Lotto. A Spend model may consist of a single 'Transaction' event combined with one or more of the previously enumerated rules.

For example, a combination of the Spend model with a Transaction event based on a Basis rule may determine a contribution amount based on an event data from financial services provider 102 generated in response to a purchase from a vendor for goods or services. Orchestrator 116 may determine the contribution amount by multiplying the purchase amount by the basis point defined by the Basis rule depending on the organization associated with the user account.

In another example, a Category rule may also be applied to the previous combination. More specifically, orchestrator 116 may determine whether the Transaction event met the criteria specified by the Category rule before the Basis rule is applied to determine the contribution amount. For example, a Category rule may specify that certain user accounts (e.g., VIP accounts or does that have signed up for certain services like direct deposit) qualify for a higher basis point of a Basis rule. Additionally or alternatively, another Category rule may specify that transactions made with certain merchants (e.g., utility company) qualify for a higher basis point of another Basis rule.

Still further, another example may include a Spend model that implements a Threshold rule, Category rule, and Fixed rule. In this case, orchestrator 116 may determine if a given transaction was in excess of a given threshold to a vendor or for a type of sale covered by the Category rule. Once these criteria are met, orchestrator 116 may calculate the contribution amount based on the value for the specified Fixed rule.

In some embodiments, a Deposit model may include a single Transaction event combined with one or more of the following rules: Basis, Fixed, Threshold, Velocity, Caps, Aggregate, Split, Duration, Elapsed, Rounding, or Average. The main difference between the Deposit and Spend models may include the direction of the transfer of money, where a transaction under a Spend model transfers funds from the user account while a transaction under a Deposit model transfers funds into the user account.

In a simple example, a Deposit model could be combined with a Transaction event with a Basis rule. In this case, orchestrator 116 may determine the contribution amount as a function of the amount of the deposit and basis points of the associated organization. Alternatively, a Deposit model combined with a Transaction event and a Rounding rule may determine a difference between the amount of the deposit and the rounded amount as the contribution amount. Still further, a Deposit model may combine with a Transaction event and an Aggregate rule to determine a contribution amount based on an aggregate deposit amount over a period.

In another example, a Caps rule may also apply that limits the contribution if the amount of the deposit and basis points were to exceed an established maximum. Alternatively, a Category rule may be applied, which could limit what sort of deposits qualified for determining the contribution amount. Still further, a Deferred rule may be applied where the account holder wanted final control over how much of a deposit is allocated to the associated organization.

As opposed to the Spend and Deposit models previously discussed, the Program model may not make use of Transaction events. Instead, the range of events encapsulated in a combination with a Program model may be a combination of the User or Schedule events and one of the following rules: Threshold, Velocity, Fixed, Caps, Aggregate, Split, Category, Duration, Elapsed, Deferred, and Lotto. The underlying activities that trigger determination of a contribution amount and subsequent contribution may be either account user actions to enroll in programs or system-initiated checks that evaluate the account holders' participation in programs over time.

For example, a simple combination may be a Program model with a User event and a Fixed rule. In this example, an account holder may enroll in a program offered by a financial institution, and a fixed amount of money may be contributed to the associated organization.

In another example, a combination of a Program model with a Schedule event, a Duration rule, and Fixed rule may determine that the account holder had been actively enrolled in a program for a year and may determine a fixed contribution amount as a reward for the continued membership.

In other embodiments, a Direct model may be combined with User and Schedule events as well as the following rules: Basis, Threshold, Velocity, Fixed, Caps, Aggregate, Split, Duration, Elapsed, Deferred, and Lotto. Unlike a Program model, the Direct model may capture the actions of an account holder to make ad hoc or scheduled contributions without regard to any other financial programs.

For example, a simple Direct model may correspond to an instance where the account holder makes an ad hoc contribution to a specific organization. In this case, the ad hoc contribution may correspond to a User event, and the amount of the ad hoc contribution may correspond to the amount under the Fixed rule.

In another example, a Direct model may combine with a Schedule event and Basis and Caps rules to calculate a contribution amount based on a multiple (specified by the Basis rule) of an account balance at the end of the month, not to exceed a given limit (specified by the Caps rule). In practice, for example, a user may configure these rules to make a regular contribution for a maximum amount. Additionally or alternatively, a Deferred rule may be added to require a confirmation from the account holder prior to committing each contribution.

Unlike Program and Direct models, a Status model may be typically initiated by orchestrator 316 based on prior configuration. In some embodiments, the events covered in the Status model may include Balance and Status events. The range of rules that can be applied may include Basis, Threshold, Fixed, Caps, Aggregate, Split, Duration, Elapsed, Rounding, Average, Deferred, Random, and Lotto.

For example, a simple combination of a Status model may use a Balance event and a Fixed rule to determine that the balance of a user account exceeds a predetermined threshold and calculate a contribution amount based on the amount specified by the Fixed rule. In some embodiments, this combination may be augmented with Elapsed and Duration rules to periodically determine and make contributions if the account balance remains above a given level over time. Furthermore, the combination of a Status event and the Elapsed and Duration rules could also be implemented to reward account holders who remain in good standing (e.g., no account overdrafts) for relatively long periods.

In some embodiments, Task models may run under a presumption that there is some desired account holder activity that can be incentivized. The Share and User events combined with the Velocity, Fixed, Caps, Aggregate, Split, Deferred, Elapsed, Random and Lotto rules may define responses to these account holder activities.

For example, a Task model may combine with the Share event and the Fixed rule to encourage posting contributions to an online forum, since such posting may raise awareness among the account holder's network of friends and encourage more people to sign up. Once an account holder has made a post, orchestrator 116 may contribute a fixed amount to the associated organization.

As another example, a Task model may combine with a User event and Velocity, Fixed, and Elapsed rules to encourage an account holder to check daily balance over time, with contributions of a fixed amount as a reward.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system comprising:
   at least one memory containing instructions; and
   at least one processor configured to execute the instructions to perform operations comprising:
      receiving, from a user device associated with a user, a first request to associate the user with a target and account information associated with the user;
      transmitting an authentication request for matching the user device to a previously authenticated device of the user, wherein an identity of the user device included in the authentication request and data representing the previously authenticated device are encrypted using hash functions;
      receiving an approval of the authentication request; and
      in response to the approval of the authentication request:
         retrieving the target from a database to associate the user with the retrieved target;
         receiving, from an entity, event data associated with the account information;
         computing an amount of contribution based on the received event data based on three axes of variation for the event data, the three axes comprising a model axis, an event axis, and a rule axis, wherein:
            the processing model axis defines one or more patterns describing the intersection of compatible events and rules,
            the event axis indicates a type of an event that triggered generation of the event data, and
            the rule axis defines one or more rules for computing the amount of contribution as a function of the event data;
         transmitting the computed amount of contribution to a distribution system configured to distribute the contribution to the associated target;
         updating the database by aggregating the computed amount of contribution to a stored contribution data associated with the user associated with the previously authenticated device;
         retrieving pre-authenticated data of the user allowing transmission of a message to a public forum;
         generating the message based on the event data and the computed amount of contribution; and
         transmitting the message to one or more devices via the public forum, wherein the computed amount of contribution is further determined based on one or more interaction metrics that the message receives on the public forum;
      receiving, from the user device, a second request to dissociate the user with the target.

2. The system of claim 1, wherein the user device is configured to present a user interface configured to receive a selection of the target and to transmit the first request to the distribution system.

3. The system of claim 1, wherein the event data comprises an occurrence of a qualifying transaction on an account associated with the account information.

4. The system of claim 1, wherein the event data comprises at least one of: a purchase transaction, a refund transaction, or a deposit transaction.

5. The system of claim 1, wherein computing the amount of contribution is based on a transaction amount associated with the event data compared to a predetermined threshold.

6. The system of claim 1, wherein computing the amount of contribution is based on a multiplier configured to apply upon meeting a preset criteria.

7. The system of claim 1, wherein transmitting the message comprises uploading the message to the public forum using a plug-in.

8. The system of claim 1, wherein the stored contribution data is an aggregate of one or more amounts of contribution from two or more users.

9. The system of claim 1, wherein the operations further comprise:
   storing contribution history data comprising the amount of contribution and the target; and
   exporting the contribution history data to a storage device in response to a user input.

10. A method comprising:
   receiving, from a user device associated with a user, a first request to associate the user with a target and account information associated with the user;
   transmitting an authentication request for matching the user device to a previously authenticated device of the user, wherein an identity of the user device included in the authentication request and data representing the previously authenticated device are encrypted using hash functions;

receiving an approval of the authentication request; and in response to the approval of the authentication request:

retrieving the target from a database to associate the user with the retrieved target;

receiving, from an entity, event data associated with the account information;

computing an amount of contribution based on the received event data based on three axes of variation for the event data, the three axes comprising a model axis, an event axis, and a rule axis, wherein:

the processing model axis defines one or more patterns describing the intersection of compatible events and rules, the event axis indicates a type of an event that triggered generation of the event data, and the rule axis defines one or more rules for computing the amount of contribution as a function of the event data;

transmitting the computed amount of contribution to a distribution system configured to distribute the contribution to the associated target;

updating the database by aggregating the computed amount of contribution to a stored contribution data associated with user associated with the previously authenticated device;

retrieving pre-authenticated data of the user allowing transmission of a message to a public forum;

generating the message based on the event data and the computed amount of contribution; and transmitting the message to one or more devices via the public forum, wherein the computed amount of contribution is further determined based on one or more interaction metrics that the message receives on the public forum;

receiving, from the user device, a second request to dissociate the user with the target.

11. The method of claim 10, wherein the user device is configured to present a user interface configured to receive a selection of the target and to transmit the first request to the distribution system.

12. The method of claim 10, wherein the event data comprises an occurrence of a qualifying transaction on an account associated with the account information.

13. The method of claim 10, wherein the event data comprises at least one of:

a purchase transaction, a refund transaction, or a deposit transaction.

14. The method of claim 10, wherein computing the amount of contribution is based on a transaction amount associated with the event data compared to a predetermined threshold.

15. The method of claim 10, wherein computing the amount of contribution is based on a multiplier configured to apply upon meeting a preset criteria.

16. The method of claim 10, wherein transmitting the message comprises uploading the message to the public forum using a plug-in.

17. The method of claim 10, wherein the stored contribution data is an aggregate of one or more amounts of contribution from two or more users.

18. The method of claim 10 further comprising:

storing contribution history data comprising the amount of contribution and the target; and exporting the contribution history data to a storage device in response to a user input.

19. The system of claim 1, wherein the operations further comprise: authenticating the user device by sending a signal to a previously authenticated device of the user.

20. The method of claim 10 further comprising: authenticating the user device by sending a signal to a previously authenticated device of the user.

* * * * *